United States Patent

[11] 3,569,723

| [72] | Inventors | David G. Brake |
| | | Welwyn Garden City; |
| | | Geoffrey Thompson, Letchworth, England |
| [21] | Appl. No. | 748,344 |
| [22] | Filed | July 29, 1968 |
| [45] | Patented | Mar. 9, 1971 |
| [73] | Assignee | British Aircraft Corporation Limited |
| | | London, England |
| [32] | Priority | Aug. 4, 1967 |
| [33] | | Great Britain |
| [31] | | 35876/67 |

[54] MEASURING APPARATUS FOR DETERMINING THE RELATIVE POSITION OF TWO COMPONENTS
20 Claims, 4 Drawing Figs.

[52] U.S. Cl. ................................................. 250/231,
 250/237
[51] Int. Cl. ..................................................... G01d 5/34
[50] Field of Search........................................... 250/231,
 231 (SE), 237, 237 (G)

[56] References Cited
UNITED STATES PATENTS

| 2,880,512 | 4/1959 | Fenemore et al. | 250/231X |
| 3,175,093 | 3/1965 | Lang | 250/231X |
| 3,453,441 | 7/1969 | Gantz et al. | 250/231 |
| 3,487,399 | 12/1969 | Wogatzke | 250/237X |

Primary Examiner—James W. Lawrence
Assistant Examiner—C. M. Leedom
Attorney—Sughrue, Rothwell, Mion, Zinn and Macpeak ABSTRACT: Measuring apparatus comprising a scale and a reading head movable over the scale. The scale includes a reference pattern track of a reference number of pattern line pitches per unit length and one or more measurement pattern tracks having a number of pattern line pitches per such unit length equal to the reference number plus a small fraction of a pitch, with the fractions being arranged in a decreasing size progression when there is more than one measurement pattern track. The reading head comprises an index for scanning the pattern tracks on the scale, the index having a pattern of approximately the reference number of pattern line pitches per such unit length to form alternating fringes between the index pattern and the scale patterns. Means are provided for individually detecting the variation of fringes formed by the cooperation of the index pattern and each of the pattern tracks on the scale.

MEASURING APPARATUS FOR DETERMINING THE RELATIVE POSITION OF TWO COMPONENTS

This invention relates to measuring systems which are of particular but not exclusive application to machine tools or measuring machines where it is required to establish the displacement of a member along a bed of such a machine.

The invention is applicable to linear or angular measurement.

Linear and angular measuring systems for such purposes have in the past employed scales of an optical grating type having a series of equally spaced grating lines defined therealong by alternate bands of different light reflecting, refracting or light transmitting qualities. Such systems utilize a reading head arranged to move along such a scale and including an index grating of a similar pattern to the scale grating arranged so that, with suitable illumination, an optical fringe pattern is formed between the scale and the index, movement or variation of which fringe pattern as the reading head is caused to move along the scale is detected by photocells. By suitable electronic means, the fringes passing the photocells are counted and the accumulated number may be digitally displayed to give an indication of the displacement of the reading head along the scale.

Such systems can be made reversible if the photocells are arranged to detect the direction of the fringe patterns passing them and the electronic counting means is also suitably arranged to add or subtract from the accumulated total appropriately.

Such systems suffer seriously from the fact that if, for some reason of electrical interference or the like, the passage of a fringe past the photo-cells is not detected then the count is lost and an error introduced into the displacement reading which error remains unless it is corrected by subsequent adjustment of the digital display. Further in their simple forms such systems only allow the counting of whole fringes corresponding to whole pitches of the scale and consequently can only resolve position down to a finite unit, corresponding to a single pitch of the scale grating. Further such systems suffer from the fact that they can only measure displacement from a known starting point or datum on the scale and can give no absolute indication of the position of a reading head along the scale without having previously been set at or to a given datum.

A further type of measuring system using such grating scales which is known provides, as well as counts of whole fringes or scale pitches, an interpolation of a single fringe into a number of divisions in order to enhance the resolution of the system. A particular type of interpolation used is where the index grating is for instance formed around the periphery of a cylinder which is caused to rotate at a constant speed so that the index grating is continuously scanning the scale grating with the resultant production of a moving or varying fringe pattern detectable by photocells. Further for the purposes of interpolation, a dividing or reference grating is fixed within the reading head with associated photocells so that the reference grating is also scanned by the cylindrical index grating, producing associated moving or varying fringes. The scale grating, the index grating and the reference grating are all of the same pitch, and by a comparison of the phases of the alternating electrical signals produced from the photocells associated with the index grating and the scale and the photocells associated with the index grating and dividing or reference grating, an interpolation of the position of the reading head within one pitch of the scale grating may be achieved. A fuller description of such a measuring system with such interpolation is given in a paper by D. L. A. Barber and M. P. Atkinson published in the Journal of Scientific Instruments volume 36, 1959 at page 501. Such a system has also an added advantage in that the output signal from the photocells is alternating, and thus avoids the problems associated with voltage instability in DC electronic circuits. This system however depends on counting of whole fringes with its associated hazards as described above, and with the absence of an absolute position indication along the length of the scale grating.

Yet a further type of measuring system has been developed using a plurality of scale patterns mounted side by side with their pitches arranged in a binary progression with the largest scale pitch corresponding to the total travel to be measured. Such systems can be arranged to given give an absolute indication of reading head position, and do not rely on counting; but thus are limited in resolution by the finest scale pitch used in the progression. They also suffer from the extreme disadvantage of the large number of scales which are necessary to give fine resolution while at the same time giving useful length of travel. A development of the principle of such binary coded scales has been made employing several scale gratings where each grating has a pitch ten times coarser than its neighbor. A more detailed description of this development is given in report No. 233 issued by the National Engineering Laboratory dated Jul. 1966. However both these last systems still suffer from the disadvantage that they produce DC signals with their attendant problems and complexity.

It is a primary object of the present invention to provide a measuring system which alleviates the disadvantages of the systems described above, in that it provides for an absolute measurement of displacement of the reading head along the scale with a fine resolution while still allowing for a long measured travel.

A measuring system according to the invention comprises a grating scale and a reading head arranged to move along said scale, wherein said scale includes a reference pattern track of a reference number of pattern line pitches per unit length and one or more measurement pattern tracks adjacent said reference pattern track, each measurement pattern track having a number of pattern line pitches per such unit length equal to said reference number plus a small fraction of a pitch, with said fractions being arranged in a decreasing size progression when there is more than one measurement pattern track, and wherein said reading head includes means for scanning said pattern tracks on said scale with an index pattern of approximately said reference number of pattern lines per such unit length to form alternating fringes between said index pattern and said scale patterns, and means for individually detecting the variation of fringes formed by the cooperation of the index pattern and each pattern track on said scale.

An alternative measuring system according to the invention comprises a grating scale and a reading head arranged to move along said scale, wherein said scale includes a reference pattern track of a reference number of pattern line pitches per unit length and one or more measurement pattern tracks adjacent said reference pattern track, each measurement pattern track having a number of pattern line pitches per such unit length equal to said reference number less a small fraction of a pitch, with said fractions being arranged in a decreasing size progression when there is more than one measurement pattern track, and wherein said reading head includes means for scanning said pattern tracks on said scale with an index pattern of approximately said reference number of pattern lines per such unit length to form alternating fringes between said index pattern and said scale patterns, and means for individually detecting the variation of fringes formed by the cooperation of the index pattern and each pattern track on said scale.

Either such above measuring system may include, according to another aspect of the invention, a dividing pattern track fixed in said reading head, said dividing pattern track being of said reference number of pattern line pitches per such unit length and arranged to be scanned by said index pattern; and means for detecting the variation of fringes formed by the cooperation of said index pattern and said dividing pattern tracks.

Any such above measuring system may include, according to a further aspect of the invention, means for deriving AC electric signals in synchronism with said variation of fringes so formed, and means for comparing the phase of the signal derived from said measurement pattern tracks or said dividing pattern track to establish the absolute position of said reading head within a range along said scale.

Throughout this Specification reference is made to optical grating scales with various pattern tracks of various number of pattern line pitches per unit length and dividing pattern tracks and scanning index patterns and the formation of alternating fringes. Further the exemplary embodiment of the invention described later in this Specification relates to a particular arrangement of the invention as applied to optical grating scale and reading head systems. However, it should be understood that the invention is not confined to optical scales and reading heads, but may be applied by suitable arrangement to scales and reading heads in which the patterns are formed by periodic variations of magnetic properties, of geometrical shape, of electrical resistance, impedance or capacity, formed by sound or ultrasonic waves in a scale medium, or formed by radio or light beams and the alternating fringes are formed by reinforcements or cancellations of those periodic variations.

Figure 1:
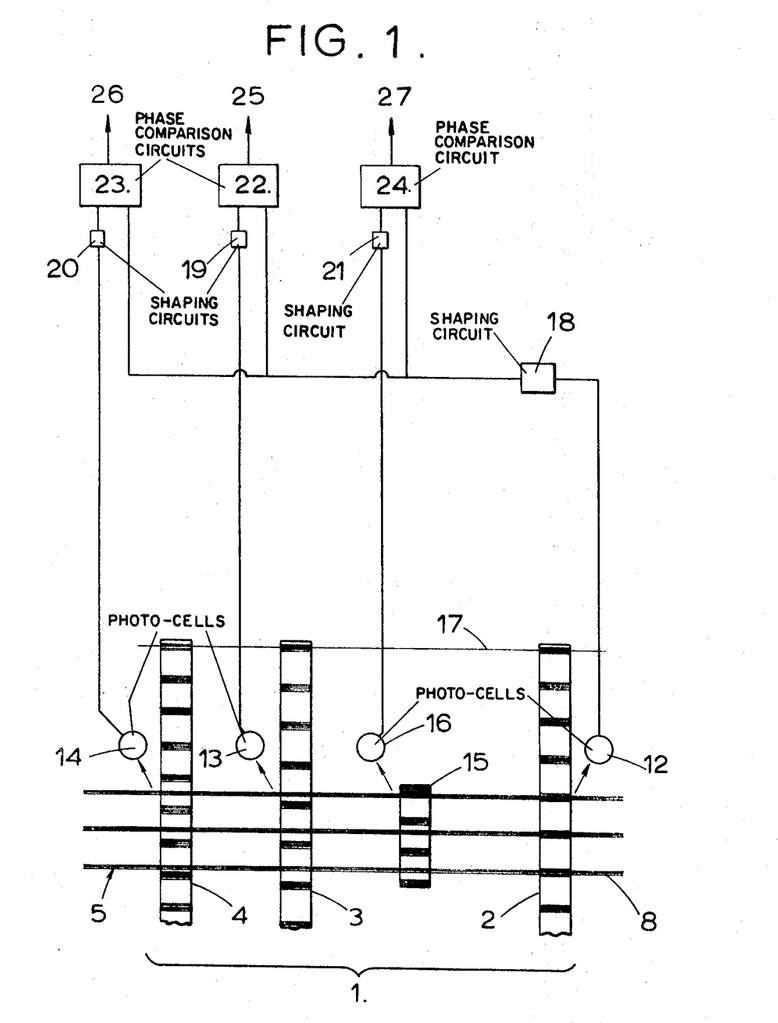
FIG. 1 is a schematic diagram of a measuring system.

In order to promote a fuller understanding of the invention, the above mentioned embodiment as particularly applied to an optical grating scale will now be described, by way of example only, with reference to the accompanying drawings in which:

FIG. 1 shows a schematic view of an optical grating scale with a schematic representation of the reading head superimposed on it.

The scale indicated generally at 1 comprises a reference pattern track 2 which is defined on the scale by a series of bands of alternating light reflective properties and light absorbing properties which bands are of approximately equal length with one reflecting and one nonreflecting band making up each of the equal pitches of the reference track 2 giving a reference number of lines per unit length. The reference track 2 in this embodiment is by way of example made to a pitch length of 1 millimeter or to 1 pattern line per millimeter.

Two measurements tracks 3 and 4 are similarly defined by alternating bands of reflective and nonreflective properties along the length of the scale adjacent the reference track 2. The pitch of the measurement track 3 is chosen to have the reference number of lines per unit length of the reference track 2 plus a small fraction, in this instance 0.1 of a line. Thus the pitch of the measurement track 3 is such that it has 1.1 lines per millimeter. The measurement track 4 is made with a pitch such that it has the reference number of lines per unit length of the reference track 2 plus a smaller fraction, in this instance .01 of a line. Thus the pitch of the measurement track 4 is such that it has 1.01 lines per millimeter.

Figure 2:
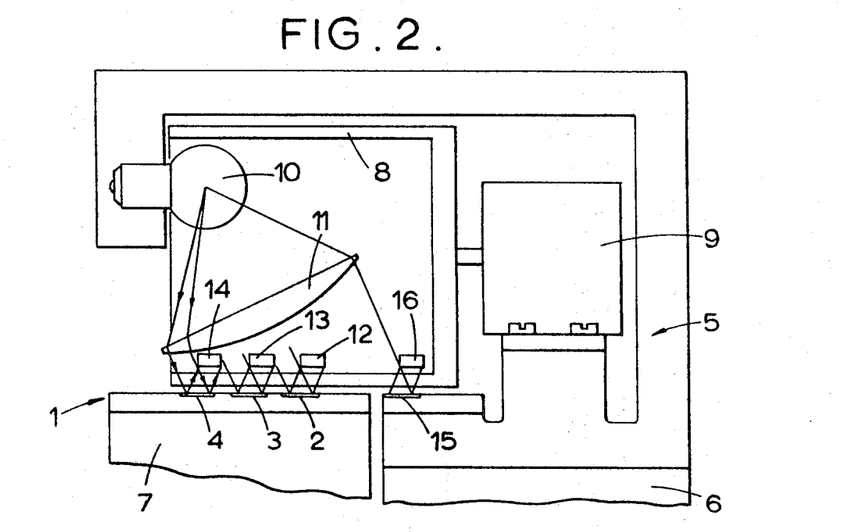
FIG. 2 is a cross-sectional view of the reading head associated with the measuring system of FIG. 1.

The reading head is indicated generally at 5 in FIG. 1 where it is shown only in schematic detail, and also generally indicated at 5 in FIG. 2 where it is shown in a schematic cross-sectional view taken in a plane perpendicular to the run of the scale 1.

The reading head 5 is mounted rigidly on a member 6 of a machine tool or measuring machine (not shown) the displacement of which it is desired to establish. The scale 1 is rigidly mounted along the bed 7 of such machine tool or measuring machine, as a standard against which such displacement is measured, so that the reading head 5 may traverse the scale.

The reading head 5 comprises a transparent cylindrical scanning index 8 which is arranged in the reading head to be rotated at a substantially constant speed by a synchronous electric motor 9.

The scanning index 8 has an index pattern of alternating light transmitting and light opaque or reducing bands defined around its periphery running axially of the scanning index 8 and of a circumferential pitch corresponding to the linear pitch of the reference pattern track 2.

An electric lamp 10 is arranged in the reading head 5 within the scanning index 8 together with a lens 11, so as to illuminate the scale 1 through the wall of the scanning index 8. Thus it can be seen that as the scanning index member 8 rotates, from a point within the scanning index member 8 it would appear that the scale 1 was being continuously scanned by an index pattern producing an alternating fringe pattern of (in this embodiment) alternating light intensity reflected from each of the tracks of the scale. Photocells 12, 13 and 14 are mounted within the reading head 5 to experience the light so reflected from the tracks 2, 3 and 4 respectively of the scale 1; and as the scanning index rotates, an AC electric reference signal output may be obtained from the photocells 12 and AC electric measurement signals may be obtained from the cells 13 and 14.

The reading head 5 also includes a dividing pattern track 15 defined on a short member, which is also scanned by the scanning index 8. The dividing pattern track 15 is defined by alternating light reflecting and light absorbing bands of the same pitch as the reference track 2. A photocell 16 is mounted within the reading head 5 so as to experience the light reflected from the dividing track 15 producing an AC electric dividing signal output therefrom.

As shown in FIG. 1, the reference track 2 and the two measuring tracks 3 and 4 are arranged so that at the beginning of the scale, for instance, the middle of the nonreflective bands forming the respective patterns are in line across the scale as indicated along the line 17 in the FIG. Thus it can be seen that the middle of a nonreflecting band on measuring track 3 will again be in line with the middle of a nonreflecting band on the reference track 2 at a point 10 millimeters or 1 centimeter along the scale from the line 17, while the middle of a nonreflecting band on the measuring track 4 will again be in line with the corresponding middle of a nonreflecting band on the reference track 2 at a distance 100 millimeters or 10 centimeters along the scale from the line 17.

Thus it can be seen that when the reading head 5 is over the scale adjacent the line 17, and the scaling index 8 is rotating then the AC signals produced by the photocells 12, 13 and 14 will be exactly in phase.

If the reading head 5 now progresses along the scale, for instance downwards as shown in FIG. 1, the AC measurement signals produced by the photocells 13 and 14 will move progressively out of phase with the AC reference signal produced by the photocell 12.

The signals produced by the photocell 13 will suffer a 360° phase change and will again be in phase with the reference signal produced by by the photocell 12 after a travel of 10 millimeters by the reading head 5. The signal produced by the photocell 14 will suffer a 360° phase change and will again be in phase with the reference signal produced by the photocell 12 after a travel of 100 millimeters by the reading head 5.

Thus if the phase of the signal produced by the photocell 13 is compared with the phase of the reference signal produced by the photocell 12 it is possible to interpolate the position of the reading head within any 10 millimeters of the reference track 2 and consequently any 10 millimeters or 1 centimeter along the length of the scale starting from the line 17. Further if a phase comparison is made between the signal produced by the photocell 14 with the reference signal produced by the photocell 12, it is possible to interpolate the position of the reading head 5 within any 100 millimeters or 10 centimeters along the length of the scale starting from the line 17.

Thus if the system shown in FIG. 1 is considered as a measuring system for a 10 centimeter travel it can be seen that if the above phase comparisons are made to within better than one-tenth part of the whole 360° phase change; it is possible by first comparing a signal from photocell 14 with the reference signal from photocell 12 to establish absolutely the position of the reading head within a 10 centimeter length from the line 17 within any one of the 10 individual centimeters; then if a phase comparison is made of the signal from photocell 13 with the reference signal from photocell 12, again to within better than one-tenth of the two whole 360° phase change, it is possible to establish absolutely to within any one of the 10 individual millimeters of that already established individual centimeter of the 10 centimeter travel.

It can be seen that establishment of the position of reading head 5 to within a particular individual millimeter is equivalent to establishing the position to within particular pitch of the reference track 2. It remains only then to interpolate the position of the reading head 5 within the already established pitch of the reference track 2.

For this purpose use is made of the output from photocell 16. As the dividing pattern track 15 moves with the reading head, and as it is of the same pitch as the reference track 2, the AC dividing signal from photocell 16 will be in phase with the reference signal from the photocell 12 once every pitch of the reference track 2 as the reading head 5 travels along the scale 1. Thus a comparison of the phase of a signal from photocell 16 with the reference signal from photocell 12 will give an interpolation of the position of the reading head 5 within any one pitch of the reference track 2; and if this is done to say one-hundredth part of the full 360° phase change, it is possible to establish the position of the reading head 5 to within 0.01 millimeters within any individual pitch of the reference track 2 and consequently by reference to the measurement tracks 3 and 4 within the full 10 centimeter of the travel of the reading head 5.

It can be seen that if an extra measurement track is added to the scale having 1.001 pitches per millimeter and the signal from an associated photocell is compared with the reference signal from photocell 12, it is possible to establish the position of the reading head 5 in a similar manner over a length of 100 centimeters of travel to within .01 millimeters. This measurement system therefore can give high resolution while giving useful length of travel and requiring comparatively for scale tracks.

The phase comparison discussed above can be made by any suitable electronic means, and FIG. 1 shows a typical arrangement in brief schematic detail only. The outputs from the photocells 12, 13, 14 and 16 are taken, by way of suitable amplifiers (not shown) if necessary, to shaping circuits 18, 19, millimeter and 21 respectively which produce a square waveform, waveform, and the outputs from the shaping circuits one-hundredth and 21 are millimeter to phase millimeter. circuits 22, 23 and 24 respectively to each of which the output from shaping circuit 18 is also supplied for reference purposes. The phase comparison circuits 22, 23 and 24 have outputs 25, 26 and 27 respectively and it can be seen that the output 26 gives the position of the reading head to within a centimeter within the 10 centimeter travel, and the output 25 gives the position of the reading head to within a millimeter in that centimeter and the output 27 gives the position of the reading head to within one-hundredth (say) of a millimeter within that millimeter.

It should be understood that while FIGS. 1 and 2 show a reflective optical grating scale system, the embodiment could be rearranged to use a transmission type of optical grating scale the scanning index being reflective of transmission as appropriate. Further by virtue of the fact that the signals taken from the photocells are AC signals, and as a consequence of the squaring operating performed by the wave shaping circuits, the system can be made insensitive to DC variations in the signals from the photocells caused by variations in illuminating intensity, variations in the characteristics of the scale of the scanning index, or caused by contamination of the scale or other such causes.

Figure 3:
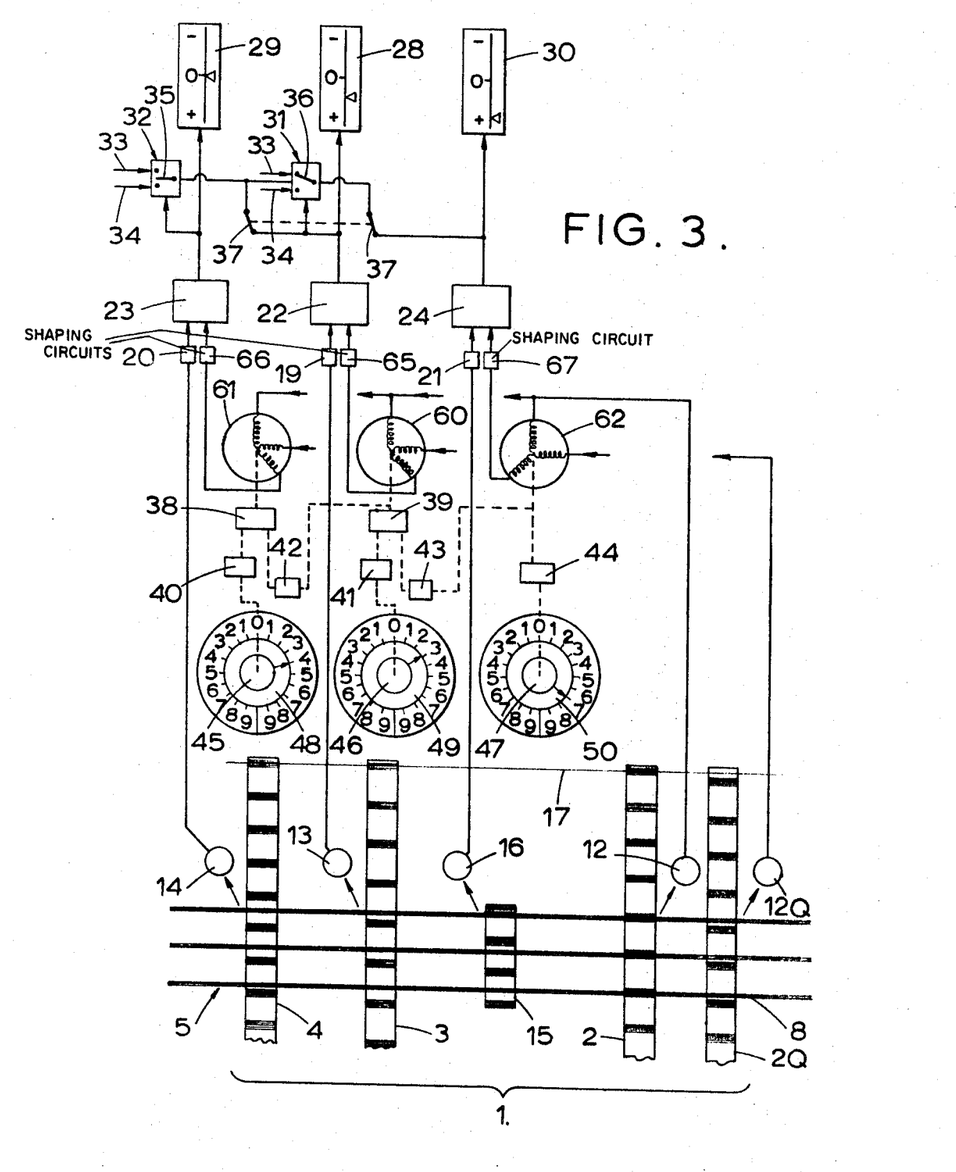
FIG. 3 is a schematic diagram of the measuring system of FIG. 1 as applied to a positioning system; and, FIG. 4 is a cross-sectional view of the reading head associated with the positioning system of FIG. 3.
Figure 4:
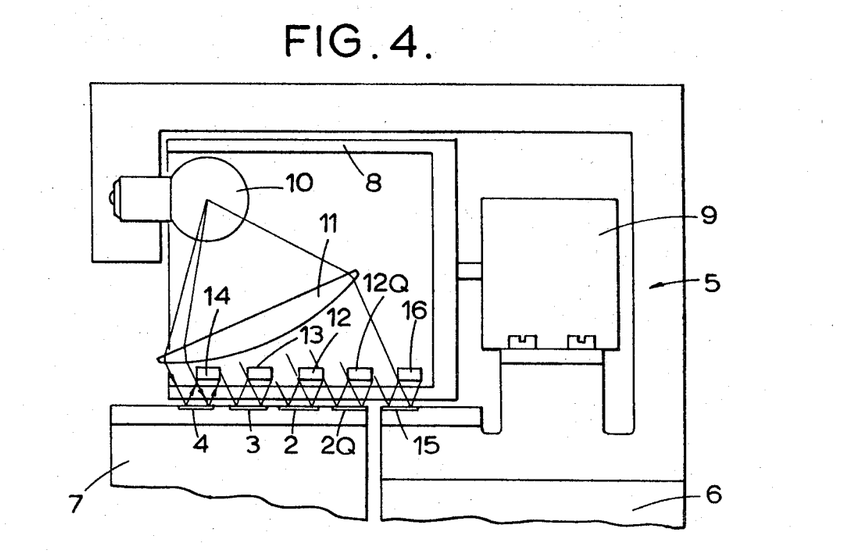

FIGS. 3 and 4 show a measuring system similar to that described with reference to FIGS. 1 and 2, arranged for application to a machine tool, for instance, where it is desired to position a member of that machine tool, for instance the work table, to a particular linear displacement from a datum on the bed in the machine tool.

In the measuring system previously described, the position of the reading head 5 along the scale was ascertained by an assessment of the phases of the signals derived from the measurement tracks and the dividing track relative to the reference signal derived from the reference track. Conversely it can be seen that if the reference signal is taken from the reference track and is subjected to a predetermined phase changes before being compared with the signals derived from the measurement tracks and the dividing track then it is possible to set up a discrete position along the scale at which the reading head 5 must be for the phase differences between the signals from the measuring tracks and the dividing track and the reference signal, so changed in phase, to be zero.

The phase comparison circuits 22, 23 and 24 then become phase or position error detectors, and their outputs may be utilized to operate either error indicators indicating when the reading head is not in the desired position as set up by the phase change operations on the reference signal, or alternatively may be utilized to drive a servo motor through suitable amplifiers to move the member carrying the reading head 5 to the desired position. In either case it can be seen that the comparison circuit 23 would give the coarsest indication or control, the comparison circuit 22 would be correspondingly finer and the comparison circuit 24 would give the final fine resolution of position.

There are many suitable means by which the reference signal from the reference track 2 may be altered in phase by an appropriate amount before being presented to the comparison circuits 22, 23 and 24. In this embodiment of the invention, synchro-resolvers 60, 61 and 62 are utilized.

For this reason it is necessary to provide an additional reference signal which is in quadrature to the reference signal derived from reference track 2 so that the original and the quadrature reference signals may be applied one each to the two stator windings of the synchro-resolvers 60, 61 and 62. The rotor winding of the synchro-resolvers 60, 61 and 62 are respectively connected to the inputs of the phase comparison circuits 22, 23 and 24 by way of shaping circuits 65, 66 and 67, and it will be seen that the phase change which the reference signal suffers before being presented to the phase comparison circuits 22, 23 and 24, is governed by the angular position of the rotors of the synchro-resolvers 60, 61 and 62 relative to their stator windings.

In order to provide the quadrature reference signal, a second reference track 2Q is provided on the scale 1. The second reference track 2Q is also scanned by the scanning index 8 and a photocell 12Q is provided in the reading head so as to experience the light reflected from the reference track 2Q. In order that the reference signal output from the photocell 12Q is in quadrature to that from photocell 12, the reference track 2Q is of the same pitch as reference track 2, but is displaced along the scale by one-fourth of a pitch of the reference pattern. This then gives the desired quadrature reference signal.

Although in this embodiment the quadrature reference signal is provided by a second reference track 2Q, it can be seen that equally this could be done by making the single reference track 2 wider and by providing a portion of the pattern on the scanning index 8 above part of the wider reference track 2, which was a quarter of a circumferential pitch of the index pattern out of line with the remainder, so that the photocell 12Q being positioned to receive light through that out of line portion would again provide the quadrature reference signal.

The outputs from the phase comparison circuits 22, 23 and 24 are respectively connected to center-zero indicating meters 28 28, 29 and 30. The phase comparison circuits 22 and 23 are also connected to the coils of two polarized relays 31 and 32 respectively. Each of these relays carried changeover contact leaves 35 and 36 respectively, which may be preadjusted to close when the current flowing through the coil of the relay exceeds a predetermined value, one contact 33 being made if the signal applied to the relay is positive and the other contact 34 being made if the applied signal is negative. A positive voltage is applied to the contact 33 of each relay 31 and 32, and a negative voltages to the contacts 34 of each relay 31 and 32. These positive and negative voltages correspond approximately to that voltage needed to produce a full scale deflection from the center zero of the meters 28 and 30. The changeover leaf 35 of relay 32 is connected to meter 28, and the changeover leaf 36 of relay 31 is connected to meter 30.

The purpose of this arrangement is to provide a bias to meter 28 so that it indicates with a full scale deflection in the same direction as the meter 29 when that meter indicated in excess of a predetermined value; and to bias meter 30 similarly with meter 28 indicating in excess of predetermined value. For example, the relays may be set so that appropriate contact are closed when the phase difference between the two inputs to the corresponding phase comparison circuit exceeds 9° A two-pole switch 37 serves to disconnect the relay contact leaves 35 and 36 from meters 28 and 30. If e desired further relays may be used in a similar manner to relays 31 and 32 from the output of phase comparison circuit 22, 23 and 24 in order to operate the traverse motor of machine to which the system is fitted, such that the rate of traverse is progressively reduced as the error indicated on the meters 28, 29 and 30 is reduced below preset value. Alternatively the signals fed to the meters may be amplified and used to control the traverse of the machine by means of a servo motor.

Where necessary, amplifiers may be inserted between the photocells and the phase comparison circuits, between the photocells and the resolvers or between the resolvers and the comparison circuits or indeed between the comparators and the relays or meters as necessary. Care must be taken in the design of such amplifiers having regard to any phase changes which the signals may suffer through them.

It will be appreciated that while the measuring system as described with reference to FIGS. 1 and 2 has a range 100 millimeters travel, the positioning system as described with reference to FIGS. 3 and 4 has a range of travel of only 50 millimeters. This is because the demanded position set up may be at one end of the range while the reading head is at the other end of the range; the meter 29 must therefore be able to show an error of plus or minus the whole range of travel of the system. Therefore the phase comparison circuit 23 must work over plus or minus the range which cannot therefore be greater than 180° of phase difference or 50 millimeters of scale.

The synchro-resolvers 60, 61 and 62 are as described above, set with their rotors at predetermined angles to determine phase changes representative of a position which is desired for the reading head 5 to take up along the scale 1. In order to assist in setting the rotors of the synchro-resolvers at the desired angle, the shaft of the synchro-resolvers 61 and 60 are connected to the output shaft of differential gearboxes 38 and 39. One input to each of these differential gearboxes 38 and 39 is connected to the output shaft of a 1:2 ration ratio gearbox 40 and 41 respectively; the other input shaft of each differential gearbox being connected to the output shaft of a 10:1 ratio gearbox 42 and 43 respectively. The rotor shaft of synchro-resolver 62 is connected to the output shaft of a 1:2 ratio gearbox 44. The input shaft of 10:1 ratio gearbox 42 is connected to the rotor shaft of synchro-resolver 60 and the input shaft of 10:1 gearbox 43 is connected to the rotor shaft of synchro-resolver 62.

The input shafts of gearboxes 40, 41 and 44 are each connected to control knobs 45, 46 and 47 respectively. Indent mechanisms (not shown) are provided so that the control knobs 45, 46 and 47 can be set in 18° angular increments each representative of an appropriate decimal displacement of the reading head 5, and if desired, the indent mechanism provided for control knobs 47 may be arranged to allow for smaller increments for example of 1.8° for a finer control. Each control knob is associated with an outer ring 48, 49 and 50 respectively and is arranged so that it may be coupled to it for angular movement or may be disconnected therefrom. The outer rings each bear a pointer which indicates its position in relation to a scale marked zero-plus 1-plus 2-plus 3-plus 4-plus 5-plus 6- plus 7-plus 8-plus 9, in a clockwise direction, and minus 1-minus 2-minus 3-minus 4-minus 5-minus 6-minus 7-minus 8-minus 9, in an anticlockwise direction. Mechanism (not shown) is provided to prevent each outer ring from being turned from plus 9 to minus 9 or from minus 9 to plus 9, except by way of zero position.

In use the system allows for the setting of the measuring system to a datum, with the reading head 5 at any position along its traverse of the scale 1, as a first step to its use for setting the machine up a desired dimension. A typical sequence of operation is as follows:

1. The machine slide carrying the reading head 5 is moved to a required datum position.
2. The outer rings 48, 49 and 50 are disconnected from the control knobs 45, 46 and 47 respectively and the switch 37 is opened. These two functions may be actuated by a single mechanism (not shown) for convenience.
3. The control knob 47 is adjusted to bring the meter 30 to a zero indication. The control knob 46 is then similarly adjusted to zero the meter 28. The control knob 45 is then similarly adjusted to zero the meter 29.
4. The required absolute dimension at which it is desired to establish the datum position is then set up on the outer range 48, 49 and 50.
5. The control knobs 45, 46 and 47 are reconnected to their outer rings 48, 49 and 50 respectively and the switch 37 is then closed. Again these two operations may be achieved by a single mechanism for convenience.

A desired datum dimension has now been set up at which the phase comparison circuits 22, 23 and 24 will produce a zero output and the meters will indicate a zero error.

Desired dimensions may now be set up and corresponding movements of the machine slide to those dimensions may be made as follows:

1. The required dimension in terms relative to the previously set datum is now set up on the outer rings 48, 49 and 50. This will immediately rotate the associated synchro-resolvers with a result that the reference signal phase will be appropriately changed and the meters 28, 29 and 30 will indicate what is now in effect a position error relative to the required dimension which has been set up.
2. The machine slide is then moved, taking the reading head 5 with it, in order to reduce the error indicated on the meters starting with the meter 29 until this is zero within the limits of resolution, then progressing to meter 28 until this is zero within the limits of resolution and then to the meter 30. Thus when the machine slide and the reading head 5 are at the dimension set up, the phase errors are again zero and the meters 28, 29 and 30 again all read zero indicative of the correct positioning of the slide.

As described above, such positioning may be carried out by means of a servo motor driven in response to the error signals derived from the phase comparison circuits 22, 23 and 24 or may alternatively be made manually.

In the positioning system described above, the required phase changes in the reference signal are produced by the use of synchro-resolvers. However this only constitutes one method of providing the phase shifted signals and any suitable method of resolving the quadrature signals from the photocell 12 and 12Q may be employed. For example the signal from the photocell 12 and 12Q may be fed to tapped transformers, preferably of a toroidal type, and an arrangement of decade switches arranged to provide combinations of pairs of signals from such transformers, giving the necessary vectorial resolutions according to the setting of the switches for a particular phase change set up indicating a particular required position. This last method of achieving the required phase changes is particularly suitable for use when the system is required to position a machine member in accordance with data provided on a punched card or paper tape, or the like, where the coded punchings on the card or tape may be decoded by means of relays or solid-state devices to set up the required interconnections of the tapped transformers.

Further while in the system described above polarized relays 31 and 32 are used as a means of biassing the indicating meters 28 and 30 to provide an unambiguous indication, and while similar relays may be utilized to control a servo motor driving the traverse of the machine element; electronic circuits, particularly solid-state devices, may be used as an alternative to the relays.

While an indicating motor may, as described, be used with each phase comparison circuit 22, 23 or 24; one meter only could be used with suitable switching provided to connect the meter so as to indicate sequentially the error signals provided by the phase comparison circuits 23, 22 and 24 in that order. Again a meter or meters need not in fact be employed at all, the error indication then being made by a series of indicator lights or electromechanical signalling devices arranged to operate sequentially by means of relays or other electronic circuits.

In both the measuring system described with reference to FIGS. 1 and 2, and the positioning system described with reference to FIGS. 3 and 4, the reference track 2 and the quadrature reference track 2Q, is chosen with a 1 millimeter pitch giving a metric measurement. It can be seen that by using different reference track pitches with varying numbers of measurement tracks, a variety of ranges of total travel for the system and resolutions may be achieved including measurement in inch units, when a preferred pitch for the reference track 2 would be 0.01 inches, or a combination of inch units and metric units side by side for dual standard use.

In the example of an inch system, resolutions to one-hundredth part of the 360° phase change by the phase comparison circuit 24 would achieve a measurement to within one ten-thousandth part of an inch, although errors in the scale pitches and other errors would reduce that accuracy in practice.

Again in both the measuring system and the positioning system, scanning of the scale tracks is achieved by a rotating scanning index 8. As an alternative to this method of scanning, an electronic method may be adopted employing two, three or more lamps, a fixed index pattern and one photocell associated with each scale track. The lamps would be arranged so that they illuminate the photocells through different parts of the fringe pattern produced by the cooperation of the index and the scale tracks. If two lamps are used they would be spaced one-fourth of a reference track pitch apart, if three are used they would be spaced one-third of a reference track pitch apart and so on. The lamps would be supplied and modulated by a two, three or multiphase phase source of current respectively in order to simulate the scanning of the scales by the index. Alternatively a single lamp, fixed index and two or more photocells per scale track similarly positioned to the lamps above, may be used to simulate the scanning by sequentially sampling the output from the photocell groups. Both these last types of method of scanning a scale are described more fully in "A High Resolution Measuring System Using Coarse Optical Gratings" by B. J. Davies et al. published as Paper No: 3312M the Institute of Electrical Engineers Nov. 1960. The signal output from the photocells in these last methods would, after filtering, approximate closely to the sinusoidal output which is produced by the rotating scanning index.

While the systems described have been particularly arranged for linear measurement and positioning, it will be appreciated that the invention is equally applicable to rotary measurement. For rotary measurement, the scale would be formed around the periphery of a drum or on the face of a disc. For a drum scale, the scanning index methods adopted could be similar to those described above, while for a disc scale, the scanning index if of a rotating type could be suitably conical with the index pattern defined thereon being suitably tapered.

Reference has been made above to the adaptation of the positioning system of FIGS. 3 and 4 to operation from punched paper tape or cards. It will be understood that such an adaptation is basically applicable to point to point positioning such as may be required for instance on a coordinate positioned table for a drilling machine. However, if magnetic recording tape is utilized for the data presentation, and the tape is recorded on multiple tracks with signals corresponding in phase relationship to the desired relationships of any given instant in time of the signals produced by the photocells in the reading head, then if suitable circuitry is provided to detect errors between the phase relationships demanded from the tape, and the phase relationships produced from the reading head and these errors are utilized to operate a servo motor through suitable amplifiers, then a continuous position control of a machine element moved by that servo motor may be achieved.

We claim:

1. Measuring apparatus comprising a grating scale and a reading head arranged to move over said scale, wherein said scale includes a reference pattern track of a reference number of pattern line pitches per unit length and at least one measurement pattern track adjacent said reference pattern track, each said measurement pattern track having a number of pattern line pitches per such unit length different from said reference number by a small fraction of a pitch with said fractions being arranged in decreasing size progression when there is more than one measurement pattern track, said scale pattern tracks being defined on said scale by alternate bands of either different light transmitting or different light reflecting properties, and wherein said reading head includes an index pattern track of approximately said reference number of pattern lines per such unit length defined on an index member by alternate bands of light transmitting properties, means for illuminating said pattern tracks to form fringes and photoelectric means individually arranged to sequentially experience parts of the fringe pattern formed by each scale pattern in cooperation with said index pattern, said fringe parts being sequentially spaced along said scale, whereby an AC electric reference signal is derived from said reference pattern track and an AC electric measurement signal is derived from each measurement pattern track, and comprising means for individually comparing the phase of said reference signal with the phase of each said measurement signal to establish the absolute position of said reading head within a range along said scale.

2. Measuring apparatus as claimed in claim 1 including means for deriving an AC electric dividing signal in synchronism with the sequential operation of said illuminating and photoelectric means, and means for comparing the phase of said dividing signal with the phase of said reference signal to establish the position of the reading head within any one pitch of said reference pattern track.

3. Measuring apparatus for determining the relative position of two components movable relative to each other, comprising a scale on one component and a reading head on the other component, the reading head being arranged to move over said scale during relative movement of the components, said scale including a reference pattern track of a reference number of pattern line pitches per unit length and a measurement pattern track adjacent said reference pattern track, the measurement pattern track having a number of pattern line pitches per such unit length different from said reference number by a small fraction of a pitch, said reading head including means for scanning said pattern tracks on said scale with an index pattern of approximately said reference number of pattern lines per such unit length to form alternating fringes between said index pattern and said scale patterns, detecting means for detecting the variation of fringes formed by the cooperation of the index pattern and the reference pattern track and for detecting the variation of fringes formed by the cooperation of the index pattern and the measurement pattern track, means for deriving an electric reference signal in synchronism with the variation of said fringes formed between the index pattern and the reference pattern track on said scale, and means for deriving an electric measurement signal in synchronism with the variation of said fringes formed between the index pattern and each measurement pattern track, and comparative means for individually comparing the phase of the reference signal with the phase of the measurement signal derived from each measurement pattern track to establish the absolute position of said reading head within a range along said scale.

4. Measuring apparatus as claimed in claim 3, further comprising a dividing pattern track fixed in said reading head, said dividing pattern track being of said reference number of pattern line pitches per such unit length and arranged to be scanned by said index pattern to form alternating fringes between said index pattern and said dividing pattern, and means for detecting the variation of fringes formed by the cooperation of index pattern and the dividing pattern track.

5. Measuring apparatus as claimed in claim 4, comprising means for deriving an electric dividing signal in synchronism with the variation of said fringes formed between the index pattern and the dividing pattern track in said reading head and further comprising means for comparing the phase of the reference signal with the phase of the dividing signal to establish the position of said reading head within any one pitch of said reference pattern track along said scale.

6. Measuring apparatus for determining the relative positions of two components movable relative to each other comprising a scale on one component and a reading head on the other component, the reading head being arranged to move over said scale during relative movement of the components, said scale including a reference pattern track of a reference number of pattern line pitches per unit length and a plurality of measurement pattern tracks adjacent said reference pattern track, each of said measurement pattern tracks having a number of pattern line pitches per such unit length different from said reference member by a small fraction of a pitch with said fractions being arranged in decreasing size progression, and wherein said reading head includes means for scanning said pattern tracks on said scale with an index pattern of approximately said reference number of pattern lines per such unit length to form alternating fringes between said index pattern and said index pattern and said scale patterns, detecting means for detecting the variation of fringes formed by the cooperation of the index pattern and the reference pattern track and for detecting the variation of fringes formed by the cooperation of the index pattern and each measurement pattern track, means for deriving an AC electric reference signal in synchronism with the variation of said fringes formed between the index pattern and the reference pattern track on said scale and means for deriving an AC electric measurement signal in synchronism with the variation of said fringes formed between between the index pattern and each measurement pattern track, and comparative means for individually comparing the phase of the reference signal with the phase of the measurement signal derived from each measurement pattern track to establish the absolute position of said reading head within a range along said scale.

7. Measuring apparatus as claimed in claim 6 comprising a dividing pattern track fixed in said reading head, said dividing pattern track being of said reference number of pattern line pitches per such unit length and arranged to be scanned by said index pattern to form alternating fringes between said index pattern and said dividing pattern; and means for detecting the variation of fringes formed by the cooperation of the index pattern and the dividing pattern track.

8. Measuring apparatus as claimed in claim 7, comprising means for deriving an AC electric dividing signal in synchronism with variation of said fringes formed between the index pattern and the dividing pattern track in said reading head and further comprising means for comparing the phase of the reference signal with the phase of the dividing signal to establish the position of said reading head within any one pitch of said reference pattern track along said scale.

9. Measuring apparatus as claimed in claim 3, wherein said reference pattern track and said measurement pattern track are defined on said scale by alternate bands of either different light transmitting or different light reflecting properties and said index pattern is defined on a surface of a cylindrical scanning index by alternate bands of different light transmitting properties, said scanning index being mounted for rotation in said reading head and arranged to be driven by an electric motor so that said index pattern thereon scans said scale pattern tracks, and wherein said means for detecting variation of said fringes and said means for deriving said AC electric signals comprise means for illuminating said patterns and photoelectric means arranged to experience the fringes formed by such illumination.

10. Measuring apparatus as claimed in claim 9, including a dividing pattern track of said reference number of pattern line pitches per such unit length fixedly mounted in said reading head and arranged to be scanned by said index pattern, said dividing pattern track defined on a dividing track member by alternate bands of either different light transmitting or different light reflecting properties; means for detecting the variation of fringes formed by the cooperation of the dividing pattern and the index pattern and means for deriving an AC electric dividing signal in synchronism with that variation, which comprise means for illuminating said dividing pattern and said index pattern and photoelectric means arranged to experience the fringes formed by such illumination; and means for comparing the phase of the dividing signal with the phase of the reference signal to establish the position of said reading head within any one pitch of said reference pattern track along said scale.

11. Measuring apparatus as claimed in claim 6, wherein said reference pattern track and each of said measurement pattern tracks are defined on said scale by alternate bands of either different light transmitting or different light reflecting properties and said index pattern is defined on a surface of a cylindrical scanning index by alternate bands of different light transmitting properties, said scanning index being mounted for rotation in said reading head and arranged to be driven by an electric motor so that said index pattern thereon scans said scale pattern tracks, and wherein said means for detecting variation of said fringes and said means for deriving said AC electric signals comprise means for illuminating said patterns and photoelectric means arranged to experience the fringes formed by such illumination.

12. Measuring apparatus as claimed in claim 11, including a dividing pattern track of said reference number of pattern line pitches per such unit length fixedly mounted in said reading head and arranged to be scanned by said index pattern, said dividing pattern track defined on a dividing track member by alternate bands of either different light transmitting or different light reflecting properties; means for detecting the variation of fringes formed by the cooperation of the dividing pattern and the index pattern and means for deriving an AC electric dividing signal in synchronism with that variation, which comprise means for illuminating said dividing pattern and said index pattern and photoelectric means arranged to experience the fringes formed by such illumination; and means for comparing the phase of the dividing signal with the phase of the reference signal to establish the position of said reading head within any one pitch of said reference pattern track along said scale.

13. Measuring apparatus as claimed in claim 3, wherein said reference pattern track and said measurement pattern track are defined on said scale by alternate bands of different light transmitting properties and said index pattern is defined on a surface of a cylindrical scanning index by alternate bands of different light reflecting properties, said scanning index being mounted for rotation in said reading head and arranged to be driven by an electric motor so that said index pattern thereon scans said scale pattern tracks, and wherein said means for detecting said variation of said fringes and said means for deriving said AC signals comprise means for illuminating said patterns and photoelectric means arranged to experience the fringes formed by such illumination.

14. Measuring apparatus as claimed in claim 13, including a dividing pattern track of said reference number of pattern line pitches per such unit length fixedly mounted in said reading head and arranged to be scanned by said index pattern, said dividing pattern track being defined on a dividing track member by alternate bands of different light transmitting properties; means for detecting the variation of fringes formed by the cooperation of the dividing pattern and the index pattern, means for deriving an AC electric dividing signal in synchronism with that variation, which comprise means for illuminating said dividing pattern and said index pattern and photoelectric means arranged to experience the fringes formed by such illumination; and means for comparing the phase of the dividing signal with the phase of the reference signal to establish the position of said reading head within any one pitch of said reference pattern track along said scale.

15. Measuring apparatus as claimed in claim 6, wherein said reference pattern track and each of said measurement pattern tracks are defined on said scale by alternate bands of different light transmitting properties and said index pattern is defined on a surface of a cylindrical scanning index by alternate bands of different light reflecting properties, said scanning index being mounted for rotation in said reading head and arranged to be driven by an electric motor so that said index pattern thereon scans said scale pattern tracks, and wherein said means for detecting said variation of said fringes and said means for deriving said AC signals comprise means for illuminating said patterns and photoelectric means arranged to experience the fringes formed by such illumination.

16. Measuring apparatus as claimed in claim 15, including a dividing pattern track of said reference number of pattern line pitches per such unit length fixedly mounted in said reading head and arranged to be scanned by said index pattern, said dividing pattern track being defined on a dividing track member by alternate bands of different light transmitting properties; means for detecting the variation of fringes formed by the cooperation of the dividing pattern and the index pattern, means for deriving an AC electric dividing signal in synchronism with that variation, which comprise means for illuminating said dividing pattern and said index pattern and photoelectric means arranged to experience the fringes formed by such illumination; and means for comparing the phase of the dividing signal with the phase of the reference signal to establish the position of said reading head within any one pitch of said reference pattern track along said scale.

17. Measuring apparatus as claimed in claim 9 wherein said scale and said scale pattern tracks are linear.

18. Measuring apparatus as claimed in claim 11 wherein said scale and said scale pattern tracks are linear.

19. Measuring apparatus as claimed in claim 9, wherein said scale and said scale pattern tracks are circular.

20. Measuring apparatus as claimed in claim 11, wherein said scale and said scale pattern tracks are circular.